United States Patent [19]
Müntener et al.

[11] Patent Number: 5,470,107
[45] Date of Patent: Nov. 28, 1995

[54] ENERGY ABSORBING STEERING COLUMN MOUNTING

[75] Inventors: Herbert Müntener, Ruggell; Michael Walser, Schaan, both of Liechtenstein

[73] Assignee: Etablissement Supervis, Vaduz, Liechtenstein

[21] Appl. No.: 271,596

[22] Filed: Jul. 7, 1994

[30] Foreign Application Priority Data

Jul. 7, 1993 [DE] Germany ............ 43 22 636.1

[51] Int. Cl.6 ........................ B62D 1/19
[52] U.S. Cl. ........................ 280/777; 74/492
[58] Field of Search ........................ 188/371, 376; 280/777, 775; 74/492, 493; 248/548, 900

[56] References Cited

U.S. PATENT DOCUMENTS

| | | | |
|---|---|---|---|
| 3,769,851 | 11/1973 | Edme et al. | 74/492 |
| 3,923,319 | 12/1975 | Nonaka et al. | 280/777 |
| 3,945,662 | 3/1976 | Murase et al. | 74/492 |
| 4,022,495 | 5/1977 | Pizzocri | 74/492 |
| 4,541,298 | 9/1985 | Strutt | 74/775 |
| 4,786,076 | 11/1988 | Wierschem | 280/777 |
| 4,915,412 | 4/1990 | Yuzuriha | 280/775 |
| 5,082,311 | 1/1992 | Melotik | 280/777 |
| 5,131,286 | 7/1992 | Sturges et al. | 74/492 |

FOREIGN PATENT DOCUMENTS

| | | | |
|---|---|---|---|
| 0516966 | 4/1992 | European Pat. Off. | |
| 7303347 | 5/1973 | Germany. | |
| 3720320 | 12/1988 | Germany. | |
| 1-156170 | 6/1989 | Japan | 74/492 |

*Primary Examiner*—Karin L. Tyson
*Attorney, Agent, or Firm*—Anderson Kill Olick & Oshinsky

[57] ABSTRACT

A safety steering system for a motor vehicle which includes a steering shaft received in a steering column, with the steering column including axially extending elongate slots having each opposite end limiting edges and spaced substantially linear limiting edges extending between the opposite end limiting edges and with the end limiting edge remote from a steering wheel side of the steering column having a circular shape defining a circular opening having a diameter, which is greater than a distance between the spaced substantially linear limiting edges, corresponding to the diameter of said circular opening, and the steering column being secured to a vehicle body with circular connecting elements extending through spacer sleeves located in the circular openings and surrounded by bushes made of an easily deformable material.

16 Claims, 3 Drawing Sheets

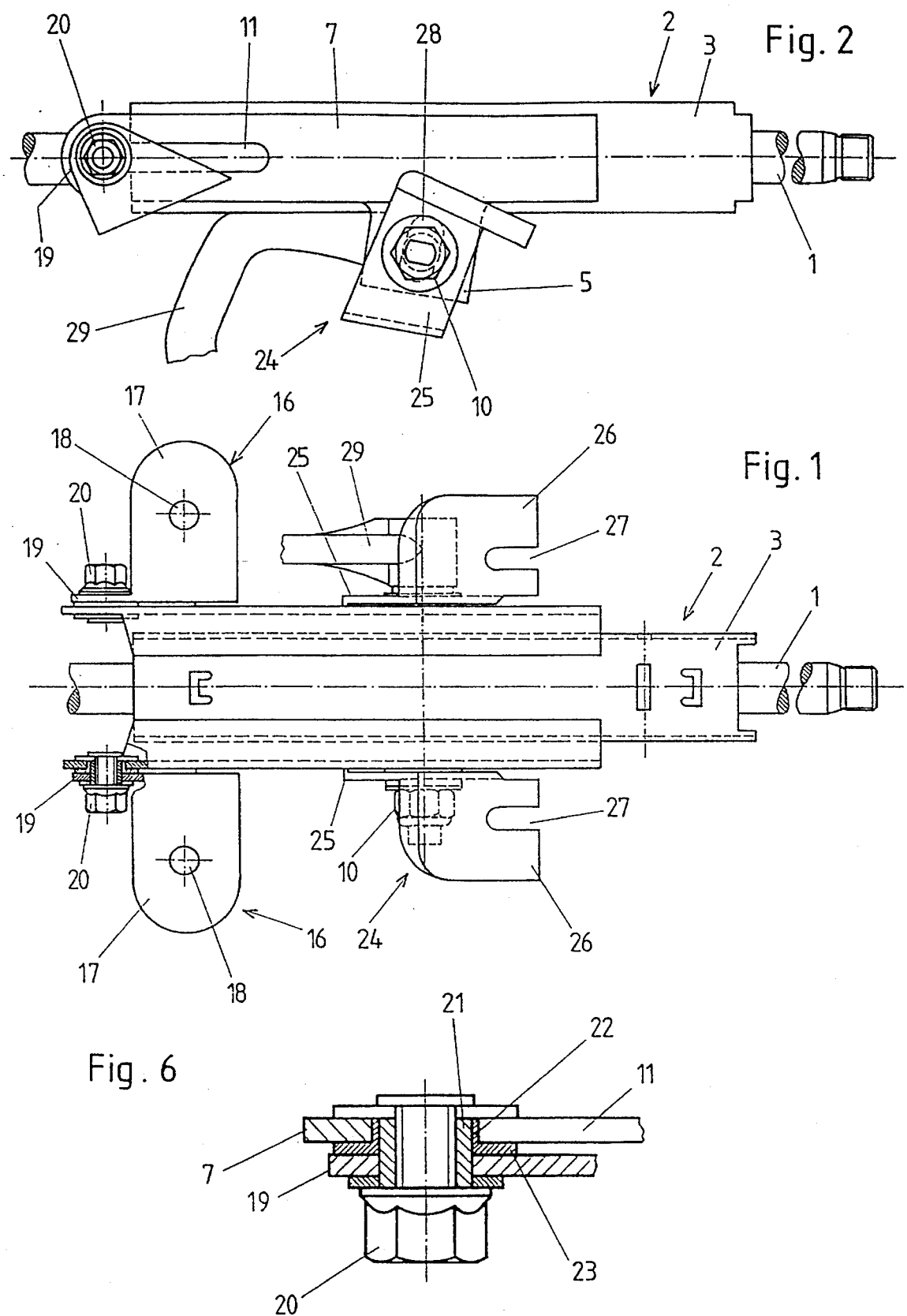

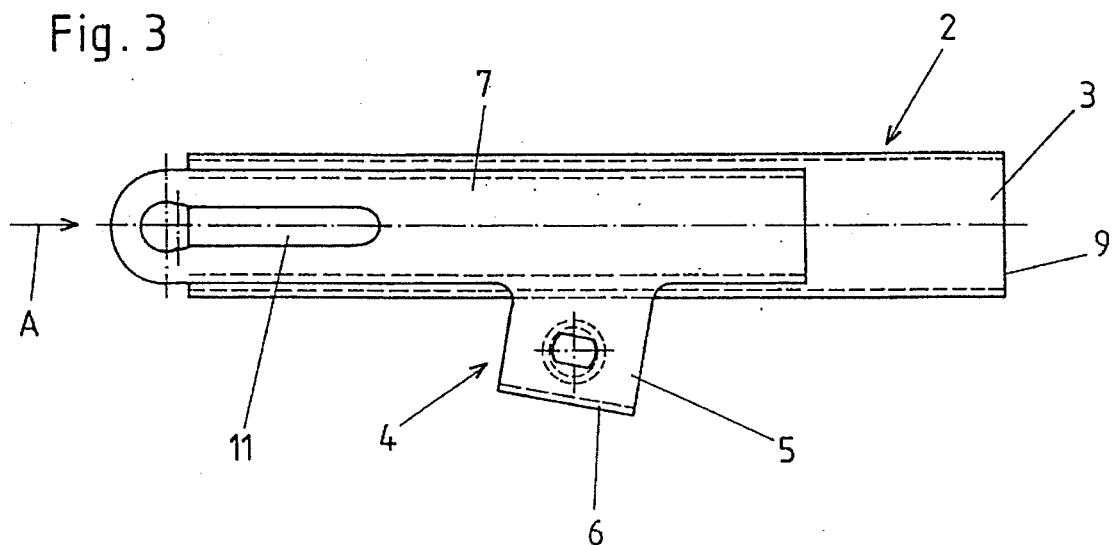
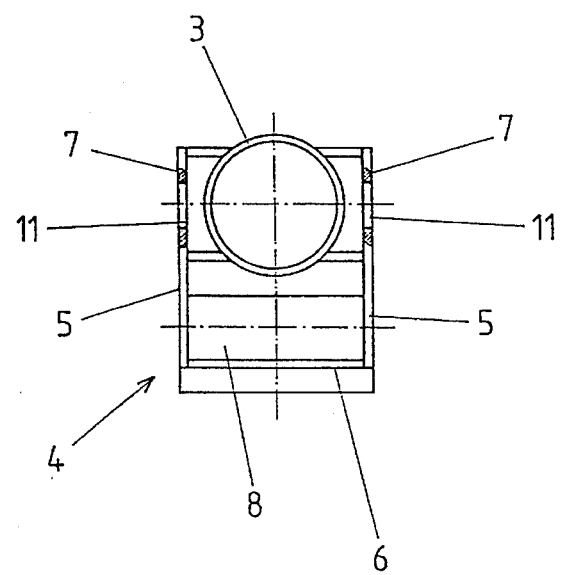
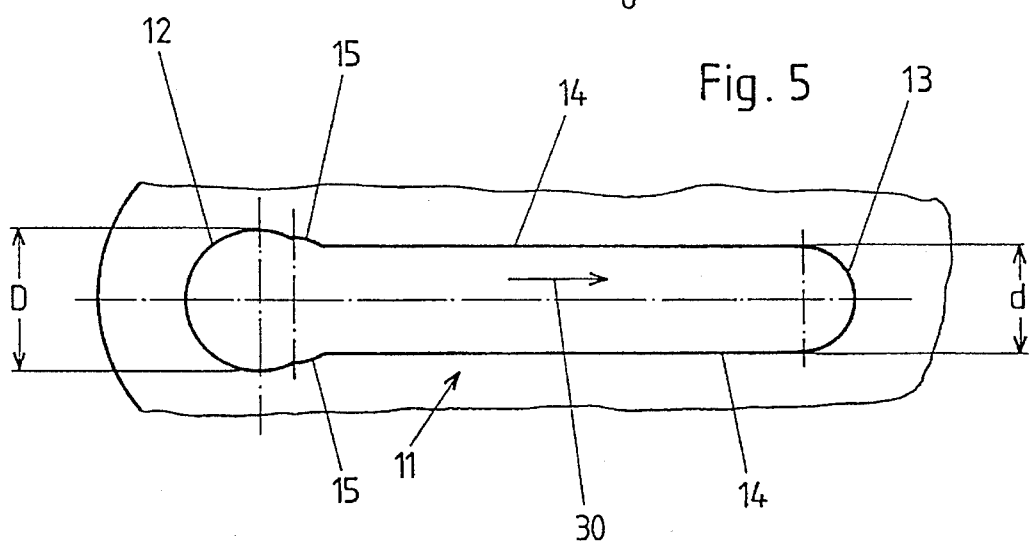

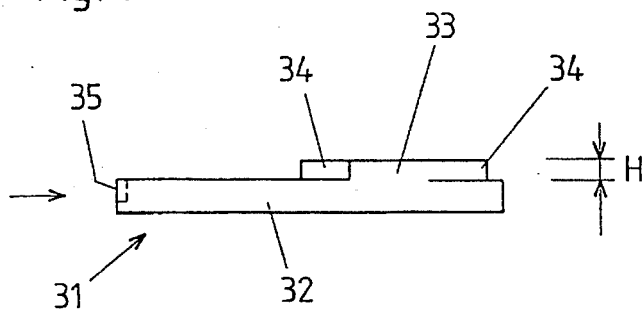
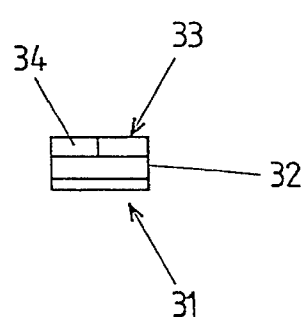
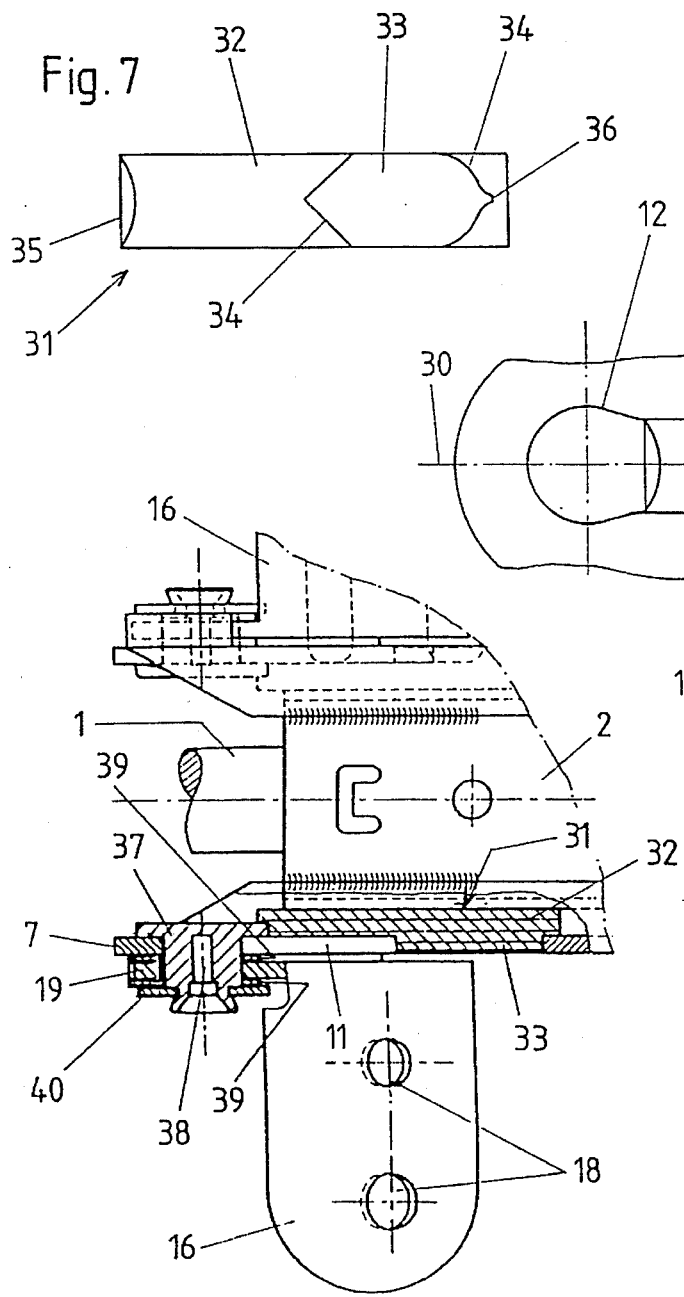
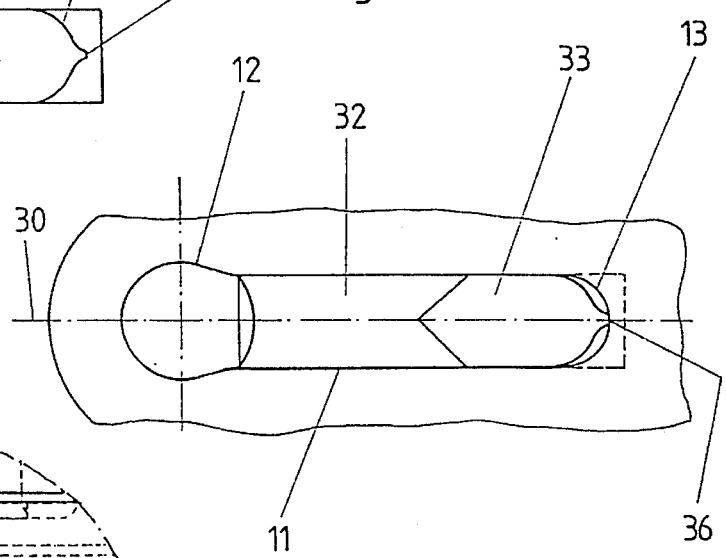

ENERGY ABSORBING STEERING COLUMN MOUNTING

BACKGROUND OF THE INVENTION

The present invention relates to a safety steering system of a motor vehicle, in particular, a passenger motor vehicle, which includes a steering column in which a steering shaft extends, and means for securing the steering column to a vehicle body, with the steering column including axially extending elongate slots having opposite end limiting edges, and spaced substantially linear limiting edges extending between the end limiting edges.

In order to meet the safety requirements of traffic codes of different countries with regard to the steering assemblies of motor vehicles, it is known to provide the steering shafts of the steering systems with so-called deformable elements which, upon impact of a driver on a steering wheel, yield under the action of impact forces to absorb the impact energy and thereby reduce the impact force acting on the driver.

Such a safety steering system is disclosed in German Utility Model No. 73 03 347. In the disclosed safety steering system, a deformable element is provided between the steering column and connecting elements for securing the steering column to the vehicle body. The deformable element is connected with the steering column and is formed of a corrugated tie strip from a flat steel.

The deformable element extends transverse to the longitudinal extent of the steering shaft or the steering column. The deformable element extends between connecting elements on opposite sides of the steering column, with the deformable element being secured to the steering column approximately at the middle of the steering column. The deformable element is secured between wing elements of the steering column and the vehicle body, with spacer sleeves being provided between undersides of the bolt heads and the vehicle body.

An object of the invention is to improve the known safety steering system so that it meets the safety requirements as precisely as possible.

Another object of the invention is to provide a safety steering system which would insure that impact forces, acting on a vehicle driver in case of an accident, would not exceed a magnitude predetermined by a traffic code.

A further object of the invention is to provide a safety steering system which would insure that the residual impact forces, which remain after the operation of the safety device, would not cause any more or less serious injury.

Yet another object of the invention is to provide a safety steering system which would retain the safety characteristics unchanged during the entire useful life of the motor vehicle, without a need in maintenance of the safety device.

SUMMARY OF THE INVENTION

These and other objects of the invention, which will become apparent hereinafter, are achieved by providing a safety steering system in which the end limiting edge, remote from a steering wheel side of the steering column, has a circular shape defining a circular opening having a diameter greater than the distance between the spaced linear limiting edges, and in which the securing device includes a spacer sleeve through which a circular connecting element extends, and a bush which is formed of an easily deformable material, surrounds the spacer sleeve and has an inner diameter corresponding to the outer diameter of the spacer sleeve, and an outer diameter corresponding to that of the circular opening.

BRIEF DESCRIPTION OF THE DRAWINGS

The features and objects of the present invention will become more apparent, and the invention itself will be best understood, from the following detailed description of the preferred embodiment when read with reference to the accompanying drawings, wherein:

FIG. 1 shows a plan view of a safety steering system according to the present invention;

FIG. 2 shows a side view of the safety steering system shown in FIG. 1;

FIG. 3 shows a side view of a steering column of a safety steering system according to the present invention;

FIG. 4 shows an end view of the steering column;

FIG. 5 shows a detail of a safety steering system in an increased scale in comparison with other views;

FIG. 6 shows a detail of a bolting of a safety steering system, according to the present invention, in an increased scale in comparison with other views;

FIG. 7 shows a plan view of a deformation element of a safety steering system according to the present invention;

FIG. 8 shows a side view of the deformation element;

FIG. 9 shows an end view of the deformation element;

FIG. 10 shows a view showing position of the deformation element in a longitudinal hole; and FIG. 11 shows a detail of riveting of a safety steering system according to the present invention.

DETAILED DESCRIPTION OF THE PREFERRED EMBODIMENT

FIGS. 1 and 2 show a safety steering assembly including a steering shaft 1 rotatably supported in a steering column 2 secured to a vehicle body. The side and end views of the steering column 2 are shown in FIGS. 3 and 4, respectively. FIG. 4 shows the end view indicated by arrow A in FIG. 3. The steering column 2 comprises a tube 3 for receiving the steering shaft 1 and its bearing support. The tube 3 is supported by a U-shaped bracket 4. The bracket 4 (see FIG. 3) has two parallel side cheeks 5 and a web 6 which connects the side cheeks 5. The upper portions of both side cheeks 5 transit into elongate U-shaped rails 7, the opening sides of which face each other. The tube 3 is located between the rails 7 and is supported thereby. The axis of the rails 7 and, therefore, the axis of the tube 3, is somewhat inclined to the plane of the web 6.

A bolt-receiving sleeve 8 is arranged between the web 6 and the tube 3 for receiving a tightening bolt 10 which insures that the side walls 5 of the bracket 4 firmly abut the end surfaces of the sleeve 8. The end surface 9 of the tube 3 is adjacent to a steering wheel (not shown). In each of the rails 7, there is provided, remotely from the end surface 9 of the tube 3, an elongate slot 11, which extends parallel to the axis of the tube 3. The elongate slot 11, which is located on a respective side of the tube 3, is shown in an increased scale in FIG. 5.

Each of the elongate slots 11 has, at opposite ends thereof, arcuate limiting edges 12 and 13 between which longitudinal edges 14 extend. The diameter D of the arcuate limiting edge 12, which is located remotely from the steering wheel, is larger than the diameter d of the limiting edge 13 which is located adjacent to the steering wheel.

The limiting edge 12 is connected with the longitudinal edges 14 by stepped segments 15. According to the invention, the linear limiting edges 14 somewhat converge to the steering wheel end of the elongate slot 11. The segments 15, instead of being arcuate as shown in FIG. 5, can be made linear. Thereby, the transition region can be made variable in accordance with the requirements which are determined by the required crash behavior.

For securing the steering column 2 to the vehicle body, there are provided angular shackles 16, each consisting essentially of a sidewise extending leg 17 having a hole 18 through which a connecting bolt 20 extends. The vertical leg 19 of the shackle 16 is connected, with a connecting bolt 20, with the respective rail 7 of the steering column. The position of the bolts 20 is determined by spacer sleeve 21. The bolts 20, together with the spacer sleeves 21, are surrounded with bushes 22 which are formed from an easily deformable material, preferably plastic material.

The inner diameter of the bush 22 corresponds to the outer diameter of the spacer sleeve 21 and corresponds to the diameter D of the arcuate limiting edge 12 of the elongate slot 11. The bush 22 has a flange 23 located between a portion of rail 7 of the steering column 2 and the leg 19 of the angular shackle 16.

The leg 19 of the shackle 16 can be extended outward due to an opening for receiving securing means, and the extended legs 19 can be connected with each other by a transverse web so that the two shackles 16 form a one-piece U-shaped element with sidewise extending legs 17.

The spacer sleeve 21 limits the action of the tightening force of the connecting bolt 20 on the joint, so that the angular shackle 16 or its leg 19 can be mounted with a possibility to pivot about the axis of the connecting bolt 20.

Further, there is provided a further U-shaped connection bracket 24 having parallel side cheeks 25 with sidewise projecting wings 26. The wings 26 have openings 27 formed each as a slot that opens toward the steering wheel. The cheeks 25 of the connection bracket 24 are provided each with congruent substantially upright elongate opening 28. The bracket 4 is located between the cheeks 25 of the connection bracket 24, so that the bolts 20, which extends through the elongate sleeves 8, also project through the elongate openings 28.

An actuating lever 29, not shown in detail, is provided on one side of the tightening bolt 10. The lever 29 is located substantially perpendicular to the longitudinal axis of the bolt 10.

The steering column 2 is secured to the vehicle body with securing bolts (not shown here), which extend through the holes 18 in the legs 17 of the shackles 16 or through the openings 27 in the wings 26 of connection bracket 24. By actuating the lever 29, the tightening bolts 10 can be tightened or released so that the steering column can be pivoted about the axis of the connecting bolts 20.

In case of an accident, the driver is pushed against the steering wheel and the steering column 2, and an impact force is generated which acts on the steering column 2 from right to left (FIGS. 1 and 2). As a result, the connecting bolts, which extend through the slots 27 of the flanges 26 of the connection bracket 24, are drawn into the vehicle body and the deformable bushes 22, upon the impact force reaching a predetermined magnitude, are partially sheared off so that the connecting bolts move inward of the elongate slots 11.

The displacement of the connecting bolts in the elongate slots 11 are shown by an arrow 30 in FIG. 5. The path and/or time-dependent displacement and a force necessary therefor depend only on the shape of the stepped segment 15, and/or an angle at which the linear limiting edges 14 converge toward the steering wheel end of the elongate slot 11, and/or on the materials and the diameters of separate bushes.

In accordance with a preferred embodiment of the invention, a deformable element 31, shown in FIGS. 7–9, is located in the elongate slots 11. In this case, the segment 15 between the end limiting edge 12 and the linear limiting edges 14 is formed relatively small, so that in case of an accident, the deformable element takes up the major part of the deformation work.

The deformable element 31 is formed as a one-piece member from a suitable plastic material. The deformable element 31 comprises an elongate main portion 32 and a segment 33 formed on the end of the main portion 32. The end profiled surfaces 34 of the segment 33 form sharp end points, with one end of the segment 33 being wedge-shaped and the other end being arcuate with a projecting tappet 36. The height h of the segment 33 corresponds to the wall thickness of the material in which the elongate slot 11 is formed. The axial length of the segment 33 is about half of the length of the slot 11.

The arrangement of the deformable element in the elongate slot 11 is shown in FIG. 10. An end surface 35 of the deformable element 31 abuts a connecting element (not shown in FIG. 10), e.g., the connecting bolt 20. The projecting tappet 36 abuts the limiting edge 13 of the slot 11. The main portion 32 lies between the tube 3 and the rail 7 (FIG. 4). In case of an accident, the connecting element, e.g., the connecting bolt 20 acts on the end surface 35 of the deformable element 31 and displaces it to the right.

At that, the tappet 36 becomes compressed and the arcuate end of the segment 33 abuts the edge 13 of the elongate slot 11. Under the action of outer forces, the segment 33 is sheared off of the main portion 32. At that, the connecting element, e.g., the bolt 20 abuts the tappet of the wedge-shaped end so that the segment 33 is completely deformed.

By the selection of the material of the deformable element 31 and, in particular, by the selection of the shape and profile of the end portions of the segment 33, and further by shaping the transition region, that is, by shaping the segments 15 between the end limiting edge 12 and the longitudinal limiting edges 14 of the elongate slot 11, the required characteristic of the force change during an accident can be obtained very precisely.

By the arrangement of the elongate slots 11 in a vertically extending structural element, the axis of the connecting bolts can simultaneously be used as a pivotal axis for readjustment of the steering wheel. The advantage of the invention, however, is also achieved when the elongate slots are provided in a substantially horizontal structural element. Thus, the flange 23 of the bush 22 would prevent the connectable parts (the rail 7 and the angular shackle 16) from directly abutting each other.

By the appropriate selection of the material of the bush 22 and the dimensions of the cooperating parts, the force change characteristic can be adjusted within wide limits and can be maintained within a practically unlimited time span. Shims and other bolting elements which are not shown in the drawings are generally used for securing the steering column to the vehicle body.

To provide a predetermined release force and to prevent a tightening moment of the bolt retention force from adversely affecting the release action, spacer sleeves are used.

An example of the connection of the steering column 2 and the angular shackle 16 is shown in FIG. 11, wherein the elements similar to those shown in other figures are designated with the same reference numerals. In the embodiment shown in FIG. 11, instead of connecting bolt 20 with a spacer sleeve 21 and a bush 22, a rivet 37 having an axial hole 38 is used.

On opposite sides of the leg 19 of the shackle 16, there are provided plastic washers 39 through which the rivet 37 extends. An outer metallic washer 40 serves as an abutment. The outer diameter of the stem of the rivet 37 is somewhat smaller than the diameter of the limiting edge 12 of the slot 11 defining an opening for the rivet 37. This facilitates mounting of the rivet 37.

The riveting die, which is not shown here, has a projecting mandrel which extends into hole 38 and widens, during riveting, the stem of the rivet 37 to eliminate the clearance between the stem of the rivet 37 and the opening defined by the limiting edge 12 of the slot 11. As a result, the body of the rivet 37 snugly engages the limiting edge 12 and no play exists between the connected structural elements.

Finally, it should be mentioned that a leaf spring connected with both the connection bracket 24 and the angular shackle 16 can be provided therebetween. The object of providing such a leaf spring consists in retaining initially, upon release of the lever 29, the connected parts in their positions to prevent too rapid pivoting of the steering column together with the steering wheel.

While the present invention has been shown and described with reference to preferred embodiments, various modifications will be apparent to those skilled in the art and, therefore, it is not intended that the invention be limited to the disclosed embodiments and/or details thereof, and departures may be made therefrom within the spirit and scope of the appended claims.

What is claimed is:

1. A safety steering system for a motor vehicle, comprising:

a steering shaft;

a steering column for receiving said steering shaft; and means for securing said steering column to a motor vehicle body, wherein said steering column includes axially extending elongate slots having each opposite end limiting edges and spaced substantially linear limiting edges extending between said opposite end limiting edges, wherein the end limiting edge remote from a steering wheel side of said steering column has a circular shape defining a circular opening having a diameter, which is greater than a distance between said spaced substantially linear limiting edges, wherein said securing means includes sleeve means located in said circular opening and having a diameter corresponding to the diameter of said circular opening, and a circular connecting element extending through said sleeve means, and wherein a deformable element is located in said elongate slot, said deformable element having an elongate main portion and a segment formed integrally therewith and located at an end portion of said elongate main portion, said segment being adapted to be sheared off said main portion upon application outer forces thereto.

2. A safety steering system as set forth in claim 1, wherein said sleeve means comprises a spacer sleeve for receiving said circular connecting element and a bush of an easily deformable material, and having an inner diameter corresponding to an outer diameter of said spacer sleeve and an outer diameter defining the diameter of said sleeve means.

3. A safety steering system as set forth in claim 1, wherein said circular connecting element is formed as a rivet having a hole which enables widening of a stem of said rivet.

4. A safety steering system as set forth in claim 1, wherein said elongate slot has a stepped segment connecting said remote limiting edge with said linear limiting edges.

5. A safety steering system as set forth in claim 1, wherein ends of said elongate slot, located adjacent to the steering wheel side of said steering column, converge.

6. A safety steering system as set forth in claim 1, wherein said deformable element is formed of a plastic material.

7. A safety steering system as set forth in claim 1, wherein said segment has opposite end face profiles, at least one of said end face profiles being one of circular-shaped and edge-shaped.

8. A safety steering system as set forth in claim 1, wherein said segment has a height corresponding to a wall thickness of a structural element in which said elongate slot is formed.

9. A safety steering system as set forth in claim 1, wherein surface of said elongate slots extend substantially vertically.

10. A safety steering system as set forth in claim 1, wherein said securing means includes a shackle having one leg with an opening through which said circular connecting element extends, and another leg secured to the vehicle body.

11. A safety steering system for a motor vehicle, comprising:

a steering shaft;

a steering column for receiving said steering shaft; and means for securing said steering column to a motor vehicle body, wherein said steering column includes axially extending elongate slots having each opposite end limiting edges and spaced substantially linear limiting edges extending between said opposite end limiting edges, wherein the end limiting edge remote from a steering wheel side of said steering column has a circular shape defining a circular opening having a diameter, which is greater than a distance between said spaced substantially linear limiting edges, wherein said securing means includes sleeve means located in said circular opening and having a diameter corresponding to the diameter of said circular opening, and a circular connecting element extending through said sleeve means, wherein a deformable element is located in said elongate slot, said deformable element having an elongate main portion and a segment formed integrally therewith and located at an end portion of said elongate portion, and wherein said segment has a length about half of a length of said elongate slot, and an edge abutting the limiting edge of said elongate slot, which is adjacent to the steering wheel side of said steering column.

12. A safety steering system as set forth in claim 11, wherein said circular connecting element comprises one of a bolt and a rivet, said segment has an end surface engaged by said one of a bolt and a rivet, and said main portion is located in a plane of said elongate slot.

13. A safety steering system for a motor vehicle, comprising:

a steering shaft;

a steering column for receiving said steering shaft; and means for securing said steering column to a motor vehicle body, wherein said steering column includes axially extending elongate slots having each opposite end limiting edges and spaced substantially linear limiting edges extending between said opposite end limiting edges, wherein the end limiting edge remote from a steering wheel side of said steering column has a circular shape defining a circular opening having a diameter, which is greater than a distance between said spaced substantially linear limiting edges, wherein said securing means includes sleeve means located in said circular opening and having a diameter corresponding to the diameter of said circular opening, and a circular connecting element extending through said sleeve means, wherein said sleeve means comprises a spacer sleeve for receiving said circular connecting element and a bush of an easily deformable material and having an inner diameter corresponding to an outer diameter of said spacer sleeve and an outer diameter defining the diameter of said sleeve means, and wherein said bush has a flange located between a structural element of said steering column, in which said elongate slots are formed, and a connecting element which connects said steering column to the vehicle body.

14. A safety steering system for a motor vehicle, comprising:

a steering shaft;

a steering column for receiving said steering shaft; and means for securing said steering column to a motor vehicle body, wherein said steering column includes axially extending elongate slots having each opposite end limiting edges and spaced substantially linear limiting edges extending between said opposite end limiting edges, wherein the end limiting edge remote from a steering wheel side of said steering column has a circular shape defining a circular opening having a diameter, which is greater than a distance between said spaced substantially linear limiting edges, wherein said securing means includes sleeve means located in said circular opening and having a diameter corresponding to the diameter of said circular opening, and a circular connecting element extending through said sleeve means, and wherein said securing means includes a U-shaped connecting bracket having wings with elongate openings arranged adjacent to the steering wheel side of said steering column, and having an open side facing a steering wheel, said wings extending sidewise of cheeks of said connecting bracket, and said steering column being located between said cheeks.

15. A safety steering system as set forth in claim 14, wherein said cheeks have straight elongate openings through which tightening bolts extend, respectively.

16. A safety steering system as set forth in claim 15, wherein the tightening bolts are connected, at one end thereof, with actuating levers each extending substantially at a right angle to an axis of a respective tightening bolt.

* * * * *